(12) United States Patent
Tabata et al.

(10) Patent No.: US 8,796,413 B2
(45) Date of Patent: Aug. 5, 2014

(54) POLYMER MATERIAL AND METHOD FOR PRODUCING SAME

(75) Inventors: Hironori Tabata, Osaka (JP); Akira Nakasuga, Osaka (JP); Norihiro Asai, Osaka (JP)

(73) Assignee: Sekisui Chemical Co., Ltd., Osaka (JP)

( * ) Notice: Subject to any disclaimer, the term of this patent is extended or adjusted under 35 U.S.C. 154(b) by 0 days.

(21) Appl. No.: 13/818,553

(22) PCT Filed: Aug. 4, 2011

(86) PCT No.: PCT/JP2011/067868
§ 371 (c)(1),
(2), (4) Date: Feb. 22, 2013

(87) PCT Pub. No.: WO2012/043060
PCT Pub. Date: Apr. 5, 2012

(65) Prior Publication Data
US 2013/0158224 A1      Jun. 20, 2013

(30) Foreign Application Priority Data

Sep. 30, 2010   (JP) ................................ 2010-222177
Oct. 14, 2010   (JP) ................................ 2010-231751

(51) Int. Cl.
    *C08G 64/00*   (2006.01)
    *B29C 35/16*   (2006.01)
    *B29C 71/00*   (2006.01)
    *B29C 45/00*   (2006.01)
    *B29C 43/00*   (2006.01)
    *C08F 6/26*    (2006.01)
    *B29C 71/02*   (2006.01)
    *C08G 63/02*   (2006.01)
    *B29C 35/02*   (2006.01)
    *B29C 43/10*   (2006.01)
    *B29C 35/08*   (2006.01)

(52) U.S. Cl.
    CPC . *C08F 6/26* (2013.01); *B29C 35/16* (2013.01); *B29C 35/0227* (2013.01); *B29C 43/10* (2013.01); *B29C 2035/0811* (2013.01); *B29C 71/0063* (2013.01); *B29C 45/0001* (2013.01); *B29C 43/003* (2013.01); *B29C 71/02* (2013.01); *B29C 2071/027* (2013.01)
    USPC .......................................... 528/480; 528/481

(58) Field of Classification Search
    CPC ...... C08G 6/005; C08G 6/28; B29K 2067/00; B29K 2069/00; B29K 2071/00; B29K 2075/00; B29K 2075/2077

USPC .................................................. 528/480, 481
See application file for complete search history.

(56) References Cited

U.S. PATENT DOCUMENTS

| 3,846,522 | A  | * | 11/1974 | Goldman ..................... 264/489 |
| 2002/0185769 | A1 | * | 12/2002 | Hasegawa et al. ............ 264/51 |
| 2008/0095982 | A1 |   | 4/2008 | Ae et al. |
| 2009/0249883 | A1 |   | 10/2009 | Hikosaka et al. |

FOREIGN PATENT DOCUMENTS

| JP | 55-74846 A | 6/1980 |
| JP | 5-241041 A | 9/1993 |
| JP | 10-296812 A | 11/1998 |
| JP | 10-337759 A | 12/1998 |
| JP | 11-88974 A | 3/1999 |
| JP | 2007-269019 A | 10/2007 |
| JP | 2008-248457 A | 10/2008 |
| WO | WO-2006/049159 A1 | 5/2006 |
| WO | WO-2007/026832 A1 | 3/2007 |

OTHER PUBLICATIONS

International Search Report for the Application No. PCT/JP2011/067868 mailed Sep. 6, 2011.
Written Opinion of the International Searching Authority (PCT/ISA/237) for the Application No. PCT/JP2011/067868 mailed Sep. 6, 2011.
Written Opinion of the International Searching Authority (PCT/ISA/237) for the Application No, PCT/JP2011/067866 mailed Sep. 6, 2011 (English Translation mailed Apr. 18, 2013).

* cited by examiner

*Primary Examiner* — Terressa Boykin
(74) *Attorney, Agent, or Firm* — Cheng Law Group, PLLC

(57) ABSTRACT

Provided are a method for producing a polymer material having a high degree of crystallization, a small variability in degree of crystallization, and a three-dimensionally isotropic crystallinity to thus give high thermal resistance, high isotropy of resin physical properties, and a small variability in resin physical properties; and the polymer material. The method for producing a polymer material includes the steps of: heating a thermoplastic resin to or above a melting point determined from a melting peak measured by DSC into a thermoplastic resin melt; applying a pressure higher than atmospheric pressure to the thermoplastic resin melt; starting cooling the thermoplastic resin melt with a pressure higher than atmospheric pressure applied thereto; releasing the pressure on the thermoplastic resin melt after cooling the thermoplastic resin melt to a cooling-end-temperature lower than an upper limit of a crystallization temperature range, wherein during the cooling, the pressure on the thermoplastic resin melt is maintained at the pressure higher than atmospheric pressure or raised. The polymer material is one obtained by the above production method.

15 Claims, 3 Drawing Sheets

US 8,796,413 B2

POLYMER MATERIAL AND METHOD FOR PRODUCING SAME

TECHNICAL FIELD

This invention relates to a polymer material made of a thermoplastic resin and a method for producing the same and more particularly relates to a polymer material having a three-dimensionally isotropic crystal structure and having a high degree of crystallization and a method for producing the same.

BACKGROUND ART

Polypropylene and polyethylene are relatively inexpensive, but has a lower thermal resistance. Therefore, these materials have limitations in applications requiring excellent thermal resistance such as electronic components and electrical equipment. In order to increase the mechanical strength and thermal resistance of thermoplastic resins including polyolefins, such as polypropylene, and polyvinyl chloride, attempts have been made to increase the crystallinity thereof. For example, there is a known method in which a melt of a thermoplastic resin is prepared and then slowly cooled. However, such a method presents a problem in that the degree of crystallization cannot sufficiently be increased.

Patent Literature 1 below discloses a method for producing a polymer-oriented crystalline body which can further increase the degree of crystallization. In Patent Literature 1, a polymer melt, such as a polypropylene melt, is stretched at a strain rate more than the critical stretching strain rate to put it into an oriented melt state. Then, the polymer melt is cooled and crystallized while being maintained in an oriented melt state. The literature states that a sheet-like polymer-oriented crystalline body increased in degree of crystallization can be thus obtained.

CITATION LIST

Patent Literature

Patent Literature 1: WO2007/026832A1

SUMMARY OF INVENTION

Technical Problem

Patent Literature 1 states that the polymer-oriented crystalline body with the higher degree of crystallization can be produced. However, since the polymer melt is put into an oriented melt state, the resultant polymer-oriented crystalline body has anisotropy in crystallinity. Therefore, polymer materials of high crystallinity having three-dimensional isotropy cannot be obtained.

In addition, although it is stated in the production method described in Patent Literature 1 that it provides sheets-like or thin-film-like molded materials with polymer-oriented crystalline, it is difficult for the production method described in Patent Literature 1 to provide molded materials with high thickness or three-dimensionally complicated shape.

Furthermore, since it is difficult for the production method described in Patent Literature 1 to provide polymer materials having three-dimensionally isotropic crystalline, these materials cannot have high isotropic physical properties such as mechanical strength. For the same reason, the method has difficulty increasing the melting points of polymer materials of various shapes as well as the thermal resistance.

The object of the present invention is to provide: a method for producing polymer materials having a high degree of crystallization, a small variability in degree of crystallization, and a three-dimensionally isotropic crystalline structures as to give high thermal resistance, high isotropic physical properties, and a small variability in physical properties; and polymer materials as such.

Solution to Problem

A method for producing a polymer material according to the present invention includes the steps of: heating a thermoplastic resin to higher temperature more than the melting point determined from a melting peak measured by DSC into a thermoplastic resin melt; applying a pressure higher than atmospheric pressure to the thermoplastic resin melt; starting the cooling of the thermoplastic resin melt with a pressure higher than atmospheric pressure applied thereto; and releasing the pressure on the thermoplastic resin melt after cooling the thermoplastic resin melt to a cooling-end-temperature lower than an upper limit of a crystallization temperature range, wherein during the cooling, the pressure on the thermoplastic resin melt is maintained at the pressure higher than atmospheric pressure or raised to a pressure still higher than the pressure from the start of the cooling until the cooling-end-temperature or lower.

It should be noted that the crystallization temperature range used in the present invention refers to a temperature range from the temperature at which the DSC curve in a DSC chart measured by differential scanning calorimetry (DSC) deviates from the base line to the temperature at which the DSC curve returns to the base line. The highest temperature in the crystallization temperature range is referred to as the upper limit of the crystallization temperature range and the lowest temperature in the crystallization temperature range is referred to as the lower limit of the crystallization temperature range.

In a particular aspect of the method for producing a polymer material of the present invention, the cooling-end-temperature is a temperature equal to or lower than the lower limit of the crystallization temperature range. In this case, the crystallinity of the resultant polymer material can have higher value. Therefore, the melting point and the thermal resistance of the resultant polymer material can be further increased.

In another particular aspect of the method for producing a polymer material of the present invention, the pressure is elevated in the cooling step from the start of the cooling until the cooling-end-temperature. In this case, the crystal density is further increased, so that a polymer material having an even higher degree of crystallization can be obtained. Therefore, the resultant polymer material can have a further increase in thermal resistance.

In still another particular aspect of the method for producing a polymer material according to the present invention, in applying the pressure to the thermoplastic resin melt, a hydrostatic pressure is applied. In this case, the pressure can surely be applied isotropically to the thermoplastic resin melt. Therefore, the resultant polymer material can have more increase in thermal resistance and in isotropy of resin physical properties. In addition, there is no limitation on the desired shape of the polymer material. In other words, polymer materials having various shapes can be easily obtained.

In the method for producing a polymer material according to the present invention, a polyolefin may be preferably used as the thermoplastic resin. The use of polyolefin having versatility can provide a polymer material having a high degree of crystallization while being inexpensive. Therefore, a polymer material having high thermal resistance can be provided at low cost.

A polymer material according to the present invention is obtained based on the method for producing a polymer material of the present invention and has a degree of crystallization of 50% or higher and isotropy of resin physical properties. Preferably, in the variation of the degree of crystallization, the maximum value thereof is preferably 1.5 or less times the minimum value thereof and more preferably 1.2 or less times the minimum value thereof. In this case, the variability in resin physical properties, such as mechanical strength and thermal resistance, can be effectively made small.

In another particular aspect of the polymer material according to the present invention, the polymer material according to the present invention is obtained based on the method for producing a polymer material of the present invention and Tm is 10° C. to 20° C. higher than Tm0. Tm0 is the melting point of the original thermoplastic resin. Tm is the melting point of the resultant polymer material and is determined from the melting peak measured by DSC.

Advantageous Effects of Invention

In the method for producing a polymer material according to the present invention, a polymer melt is cooled with a pressure higher than atmospheric pressure applied thereto. Therefore, even if the cooling has been accompanied by the start of transition of the polymer melt from a melt state to a state in which the molecular movement of the thermoplastic resin is restricted, the applied pressure acts on the polymer melt in the latter state. Therefore, by cooling the polymer melt to the cooling-end-temperature lower than the upper limit of the crystallization temperature range with the pressure applied thereto, a crystal structure having three-dimensional isotropy is formed. Furthermore, in the polymer material having the above crystal structure, the variability in degree of crystallization can be made small. Additionally, since the crystallization starts and progresses under the pressure applied, the resultant polymer material can be increased in degree of crystallization.

Since, as described above, the polymer material obtained by the production method of the present invention has a crystal structure having three-dimensional isotropy and is increased in degree of crystallization, it can be increased in melting point. Therefore, the polymer material can be increased in thermal resistance.

In addition, since the polymer material has a crystal structure having three-dimensional isotropy, it can be increased in isotropy of resin physical properties, such as mechanical strength and thermal resistance. Furthermore, since the polymer material has a small variability in degree of crystallization, its variability in resin physical properties can be made small.

The polymer material of the present invention obtained by the above production method has an increased degree of crystallization, a small variability in degree of crystallization, and a three-dimensionally isotropic crystallinity. Therefore, a polymer material can be provided which has a degree of crystallization of 50% or higher and isotropy of resin physical properties. In addition, a polymer material can be obtained which has a melting point 10° C. to 20° C. higher than the melting point of the original thermoplastic resin.

DESCRIPTION OF EMBODIMENTS

Figure 1:
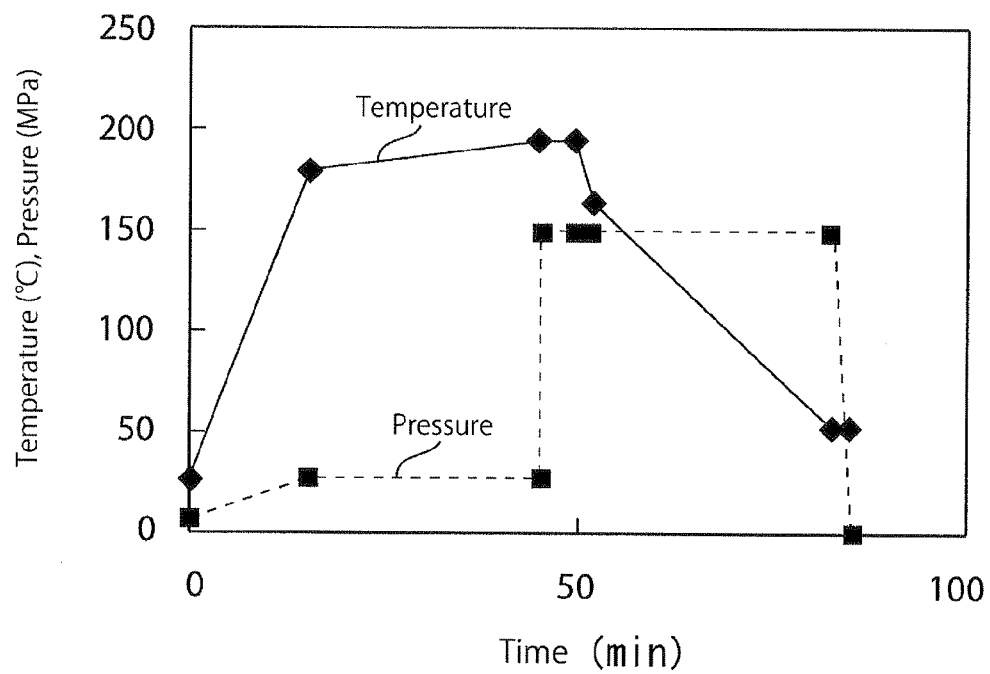
FIG. 1 is a graph showing a heat application profile and a pressure application profile in Example 1.

Hereinafter, a description will be given of details of the present invention.

In a method for producing a polymer material according to the present invention, a thermoplastic resin is heated to or above a melting point Tm0. No particular limitation is placed on the thermoplastic resin to be used and various thermoplastic resins can be used, including polyolefins, such as polypropylene, polyethylene, and ethylene-α-olein copolymers, polyvinyl chloride, polystyrene, polyamides, polycarbonates, saturated polyesters, and polymethacrylic acid esters. Preferably, polyolefins, such as polypropylene, can be suitably used because they are inexpensive and easily available. In addition, the transparent resins above listed can be suitably used for optical applications, such as optical lenses, by increasing the degree of crystallization of these transparent resin to thus increase the refractive index.

There is no particular limitation as to the shape of the thermoplastic resin to be prepared. However, it is preferred to use a thermoplastic resin molded body having a shape corresponding to the shape of a resultant polymer material. Thus, even when the thermoplastic resin molded body is heated to or above the melting point Tm0 into a thermoplastic resin melt, immediate cooling thereof with the pressure applied thereto can provide a polymer material having the same shape as the original thermoplastic resin molded body. Therefore, it is preferred that in heating the thermoplastic resin molded body to or above the melting point Tm0 into a thermoplastic resin melt, the thermoplastic resin molded body should be placed in a container for maintaining the initial outer shape of the thermoplastic resin molded body. By doing so, after the thermoplastic resin melt is cooled with the pressure applied thereto, a polymer material having the same shape as the original thermoplastic resin molded body can be obtained.

There is no particular limitation as to the method for heating the thermoplastic resin and various methods can be used, such as high-frequency induction heating and a method in which an oven or a heater is used. However, because a pressure application process to be described later must be performed, a method capable of heating in a vessel or device in which pressure can be applied should be used.

The melting point Tm0 of the thermoplastic resin is a melting point determined from a melting peak measured by DSC (differential scanning calorimetry).

In the method for producing a polymer material according to the present invention, the thermoplastic resin is heated to or above the melting point as described above, a pressure higher than atmospheric pressure is applied to the thermoplastic resin melt, and the thermoplastic resin melt is cooled with the pressure applied thereto. This pressure application may be made from the stage of heating of the thermoplastic resin or may be made after the point of time when the thermoplastic resin has been turned into a thermoplastic resin melt by heat application to or above the melting point. In any case, it is necessary that at the start of cooling of the thermoplastic resin melt a pressure above atmospheric pressure should be applied to the thermoplastic resin melt. Furthermore, it is necessary to perform the cooling step maintaining the pressure applied to the resin melt.

The pressure applied to the thermoplastic resin melt in the cooling step may be maintained at above pressure higher than atmospheric pressure at least until a cooling-end-temperature, which is lower than the upper limit of a crystallization temperature range. In this case, there is no need to change the pressure, so that the operation can be simplified.

It should be noted that the crystallization temperature range used in the present invention refers to a temperature range from the temperature at which the DSC curve in a DSC chart measured by differential scanning calorimetry (DSC) deviates from the base line to the temperature at which the DSC curve returns to the base line. The highest temperature in the crystallization temperature range is referred to as the upper limit of the crystallization temperature range and the lowest temperature in the crystallization temperature range is referred to as the lower limit of the crystallization temperature range.

Alternatively, in the cooling step from the start of cooling until the cooling-end-temperature, the pressure may be further increased. In this case, the crystal density in the resultant polymer material is further increased, so that a polymer material having an even higher degree of crystallization can be obtained. Therefore, the resultant polymer material can be further increased in melting point. Hence, the thermal resistance can be further increased.

In the method for producing a polymer material of the present invention, the cooling is started with a pressure higher than atmospheric pressure applied to the thermoplastic resin melt. In this case, the pressure higher than atmospheric pressure may have been applied before the start of cooling or may be applied at the start of cooling.

In the thermoplastic resin melt in a melt state, molecules of the thermoplastic resin can move freely. However, when pressure is applied to the thermoplastic resin melt, the free molecular movement of the thermoplastic resin is restricted by the pressure. If, in this case, the thermoplastic resin melt is cooled with the pressure applied thereto, the thermoplastic resin melt is transferred from a melt state to a solid state as the molecular movement thereof is restricted. Therefore, while the thermoplastic resin melt transits to a solid state, its three-dimensionally isotropic crystallization progresses.

In the present invention, it is necessary that during the transition from the state in which the molecules are freely movable to the state in which the molecules are not freely movable, the above pressure-applied condition should be maintained. Thus, the cooling progresses as the molecular movement of the thermoplastic resin is restricted, so that three-dimensionally isotropic crystallization progresses. Therefore, a polymer material having a three-dimensionally isotropic crystal structure can be obtained. Hence, the resultant polymer material can be increased in melting point and thermal resistance. In addition, the resultant polymer material can be increased in isotropy of physical properties. Furthermore, the variability in degree of crystallization can be made small, so that the variability in resin physical properties of the resultant polymer material can be made small. It should be noted that resin physical properties used in the present invention refers to the physical properties obtained by the resin, such as mechanical strength, thermal resistance, and refractive index.

Additionally, since the cooling progresses as the molecular movement is restricted, the resultant polymer material can be increased in degree of crystallization. Thus, the melting point of the resultant polymer material becomes higher than that of the original thermoplastic resin. Therefore, a polymer material having superior thermal resistance can be obtained.

It should be noted that it is preferred that the condition of a higher pressure than atmospheric pressure should be maintained until the cooling-end-temperature is reached. In this case, the resultant polymer material can be further increased in degree of crystallization. Therefore, the resultant polymer material can be further increased in thermal resistance.

There is no particular limitation as to the pressure required for the above pressure application so long as it is equal to or above atmospheric pressure. The pressure is preferably 1 MPa or above and more preferably 10 MPa or above. When the pressure is 1 MPa or above and more preferably 10 MPa or above, a three-dimensionally isotropic crystal structure can be surely obtained and the degree of crystallization can be more effectively increased. Thus, the resultant polymer material can be effectively increased in melting point and thermal resistance. In addition, the isotropy of resin physical properties can be further increased.

It should be noted that there is no particular limitation on the upper limit of the pressure during the pressure application so long as it can provide a three-dimensionally isotropic crystal structure. However, if the pressure is too high, facilities for use in the pressure application will be large, so that the cost for the facilities may be high. Therefore, the upper limit of the pressure is preferably 200 MPa or below.

There is no particular limitation as to the amount of raised pressure necessary when the pressure is further raised during the cooling step, but it is preferably 5 to 50 MPa or above. By raising the pressure within this range, the degree of crystallization can be further increased and, additionally, the variability in degree of crystallization can be made even smaller. Thus, the resultant polymer material can be further increased in thermal resistance and further decreased in variability in resin physical properties.

There is no particular limitation as to the pressure application method; for example, a method can be used in which a thermoplastic resin is inserted into any type of pressure medium and a pressure is applied to the pressure medium by a pressure source, such as a pump. Examples of the pressure medium that can be used include water and oil. Alternatively, gas may be used as the pressure medium. However, in applying pressure to the thermoplastic resin using gas as the pressure medium, it is preferred to use a gas incapable of permeating the thermoplastic resin. Thus, with the use of nonpermeating gases, the resultant polymer material can be prevented from being reduced in density.

The pressure application method is preferably made using a hydrostatic pressure. With the use of a hydrostatic pressure, the pressure can be applied to the thermoplastic resin evenly from around, i.e., isotropically. Therefore, the isotropy of crystallinity can be further increased. Furthermore, the shape of the thermoplastic resin is not limited to a sheet-like shape and a thick thermoplastic resin molded body or a thermoplastic resin of complicated shape can also be used. Therefore, polymer materials of various shapes can be easily obtained.

The pressure application time varies depending upon the cooling rate, the melting point of the thermoplastic resin, and the crystallization temperature range. For example, when the thermoplastic resin is polypropylene, the pressure application time is preferably 10 seconds or more from the start of cooling and more preferably 60 seconds or more from the start of cooling.

In the method for producing a polymer material of the present invention, the cooling to a temperature lower than the upper limit of the crystallization temperature range allows crystallization to progress with the molecular movement restricted as described above. Thus, a polymer material having a high degree of crystallization can be obtained by the above cooling. Therefore, in the method for producing a polymer material of the present invention, the pressure is eliminated at a cooling-end-temperature lower than the upper limit of the crystallization temperature range. The pressure elimination can be implemented by releasing the pressure, such as a hydrostatic pressure.

As seen from the above, in the method for producing a polymer material of the present invention, a polymer material can be obtained which has a high degree of crystallization and a three-dimensionally isotropic crystallinity. Therefore, the resultant polymer material can be increased in melting point and thermal resistance and also increased in isotropy of resin physical properties. Since the polymer material also has a small variability in degree of crystallization, its variability in resin physical properties can be made small.

There is no particular limitation as to the cooling-end-temperature so long as it is lower than the upper limit of the crystallization temperature range. However, the cooling-end-temperature is preferably a temperature equal to or lower than a lower limit of the crystallization temperature range. In this case, the resultant polymer material can be further increased in crystallinity. Therefore, the resultant polymer material can be further increased in melting point and thermal resistance.

A polymer material of the present invention is obtained by the production method of the present invention and has a degree of crystallization of 50% or higher and its resin physical properties have three-dimensional isotropy. The expression "resin physical properties have three-dimensional isotropy" means that the physical properties of the resin provided by increased degree of crystallization have three-dimensional isotropy. For example, it means that the resin physical properties, such as mechanical strength and thermal resistance, have three-dimensional isotropy.

The degree of crystallization varies so that the maximum value thereof is preferably 1.5 or less times the minimum value thereof and more preferably 1.2 times the minimum value thereof. In this case, a polymer material can be provided which has a small variability in resin physical properties, such as mechanical strength and thermal resistance.

The variability in degree of crystallization can be evaluated, by measuring the degree of crystallization of each of polymer materials prepared as samples at a plurality of points of the polymer material as will be described later in the section of Examples, based on the degrees of crystallization at the plurality of points.

The polymer material of the present invention has a high degree of crystallization of 50% or higher as described above and additionally has a three-dimensionally isotropic crystallinity. Therefore, the polymer material made of a thermoplastic resin, such as polypropylene, can be increased in isotropy of resin physical properties. In addition, since the degree of crystallization is increased, the polymer material can also be increased in thermal resistance.

Alternatively, a polymer material of the present invention is one obtained by the production method of the present invention and having a Tm 10° C. to 20° C. higher than Tm0.

Tm0 is the melting point of an original thermoplastic resin and Tm is the melting point of the resultant polymer material. The reason why the melting point of the polymer material is 10° C. to 20° C. higher than that of the original thermoplastic resin is that the degree of crystallization has been increased by the previously-described production method of the present invention. Specifically, since the thermoplastic resin melt is cooled to a cooling-end-temperature lower than the upper limit of the crystallization temperature range with a pressure applied thereto, the polymer material obtained as described previously can be increased in degree of crystallization. Thus, the melting point of the polymer material is increased, so that a polymer material having superior thermal resistance can be obtained. In addition, as described previously, not only a sheet-like formed body and a thin formed body but also a thick formed body and a formed body of complicated shape can be obtained.

Hereinafter, the present invention will be described in further detail with specific examples of the present invention and comparative examples. However, the present invention is not limited to the following examples.

Example 1

Prepared was an injection-molded body made of polypropylene (polypropylene resin Grade MA3H having a melting point of 167° C. and a crystallization temperature range of 80° C. to 150° C., manufactured by Japan Polypropylene Corporation) and having a shape of 80 mm by 5 mm by 1 mm thick. This polypropylene resin injection-molded body was enclosed in a pressure vessel at an ordinary temperature (25.7° C.) and the initial pressure was set to be a hydrostatic pressure of 5 MPa. Then, the polypropylene resin injection-molded body enclosed in the pressure vessel was heated to 180° C. by a mantle heater disposed outside the pressure vessel. By the heating, the hydrostatic pressure elevated to 27 MPa. Thereafter, the injection-molded body was heated to 190° C. in 30 minutes by the mantle heater. The pressure was raised to 150 MPa at the time the temperature reached 190° C. and the pressure was then held for five minutes. Thereafter, the injection-molded body was cooled to 165° C. at a cooling rate of 10° C./rain or higher while the pressure was maintained at 150 MPa. Subsequently, the injection-molded body was cooled to 55° C. while the pressure was maintained at 150 MPa. After the cooling, the pressure was eliminated and the formed polypropylene resin molded body was taken out, resulting in a formed polypropylene resin body. The heat application profile and pressure application profile in the above heating, pressure application, and cooling steps in Example 1 are shown in FIG. 1 and Table 1.

TABLE 1

| Time | Temperature | Pressure |
|---|---|---|
| 0 | 25.7 | 5 |
| 15 | 180 | 27 |
| 45 | 197 | 30 |
| 45 | 197 | 150 |
| 50 | 197 | 150 |
| 50.1 | 197 | 150 |
| 52 | 165 | 150 |
| 83 | 55 | 150 |
| 85 | 55 | 0 |

Example 2

Figure 2:
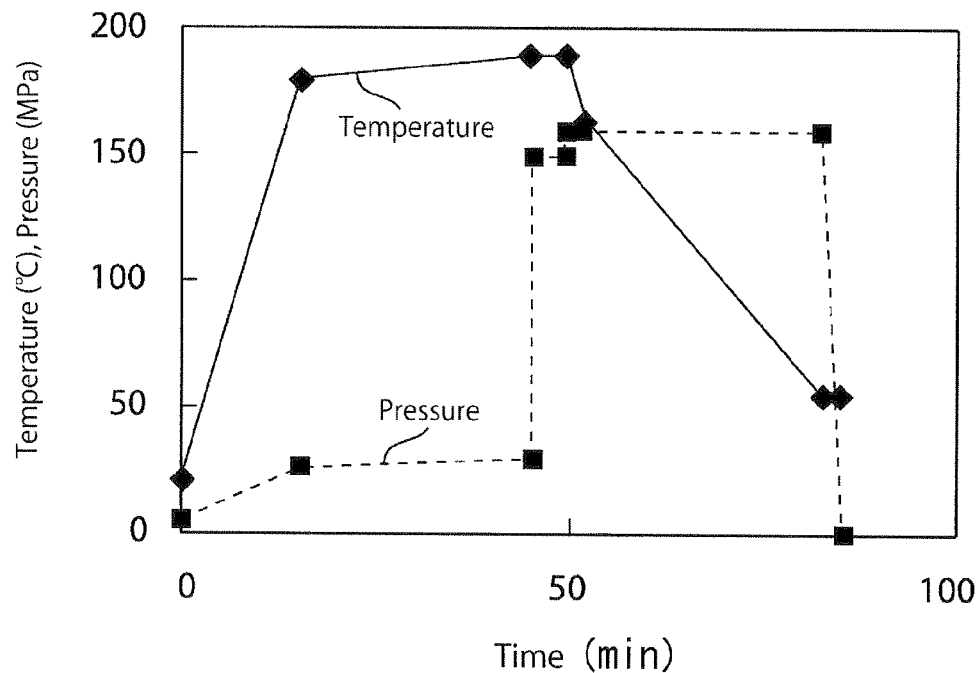
FIG. 2 is a graph showing a heat application profile and a pressure application profile in Example 2.

A polypropylene resin molded body was subjected to heat application, pressure application, and cooling in the same manner as in Example 1 except that the pressure at the start of cooling was raised to 160 MPa, resulting in a formed polypropylene resin body. The heat application profile and pressure application profile in the above heating, pressure application, and cooling steps in Example 2 are shown in FIG. 2 and Table 2.

TABLE 2

| Time | Temperature | Pressure |
| --- | --- | --- |
| 0 | 25.7 | 5 |
| 15 | 180 | 27 |
| 45 | 190 | 30 |
| 45 | 190 | 150 |
| 50 | 190 | 150 |
| 50.1 | 190 | 160 |
| 52 | 165 | 160 |
| 83 | 58 | 160 |
| 85 | 58 | 0 |

Example 3

Figure 3:
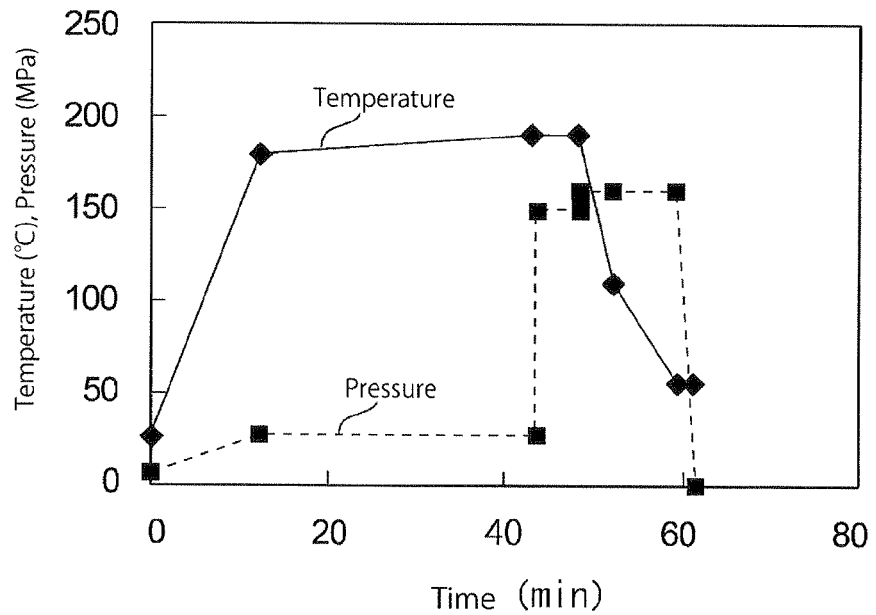
FIG. 3 is a graph showing a heat application profile and a pressure application profile in Example 3.

A polypropylene resin molded body was subjected to heat application, pressure application, and cooling in the same manner as in Example 2 except that the molded body was cooled to 115° C. at a cooling rate of 10° C./min or higher while the pressure was maintained at 160 MPa, resulting in a formed polypropylene resin body. The heat application profile and pressure application profile in the above heating, pressure application, and cooling steps in Example 3 are shown in FIG. 3 and Table 3.

TABLE 3

| Time | Temperature | Pressure |
| --- | --- | --- |
| 0 | 25.7 | 5 |
| 13 | 180 | 27 |
| 43 | 191 | 30 |
| 43 | 191 | 150 |
| 48 | 191 | 150 |
| 48.1 | 191 | 160 |
| 52 | 110 | 160 |
| 59 | 58 | 160 |
| 61 | 58 | 0 |

Example 4

Polypropylene (polypropylene resin Grade MA3H having a melting point of 167° C. and a crystallization temperature range of 80° C. to 150° C., manufactured by Japan Polypropylene Corporation) was cut out into a block test piece of 50 mm by 50 mm by 50 mm. The block test piece was put into a sample bag made of a composite film obtained by vacuum-depositing aluminum onto the inside surface of a synthetic resin film and the sample bag was enclosed in a pressure vessel at an ordinate temperature (25.7° C.). The pressure vessel was filled around the sample bag with water as a pressure medium. The sample bag can prevent the contact of water with the test piece while transmitting a surrounding pressure to the test piece located thereinside. The initial pressure was a hydrostatic pressure of 5 MPa.

Next, the polypropylene resin injection-molded body enclosed in the pressure vessel was heated to 180° C. by a mantle heater disposed outside the pressure vessel. By the heating, the hydrostatic pressure raised to 27 MPa. Thereafter, the injection-molded body was heated to 190° C. in 30 minutes by the mantle heater. The pressure was raised to 150 MPa at the time the temperature reached 190° C. and the pressure was then held for five minutes.

Figure 4:
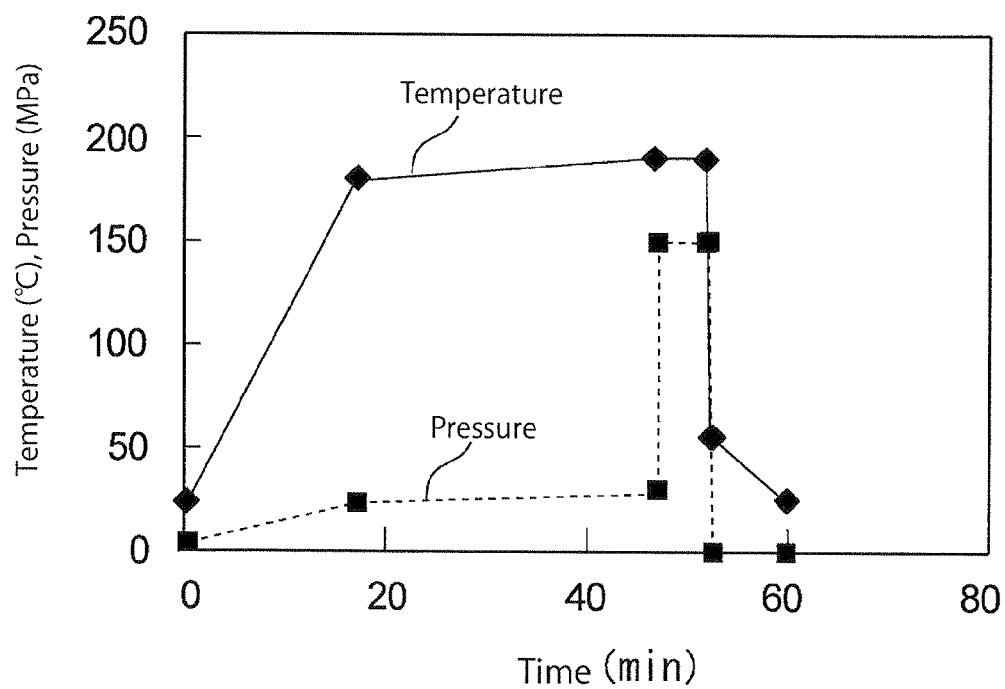
FIG. 4 is a graph showing a heat application profile and a pressure application profile in Example 4.

Thereafter, the injection-molded body was cooled to 55° C. at a cooling rate of 10° C./min or higher while the pressure was maintained at 150 MPa. After the cooling, the pressure was eliminated and the sample bag was taken out and then cooled to room temperature. Subsequently, the test piece treated in the above manner was taken from the sample bag, resulting in a formed polypropylene resin body. The heat application profile and pressure application profile in the above heating, pressure application, and cooling steps in Example 4 are shown in FIG. 4 and Table 4.

TABLE 4

| Time | Temperature | Pressure |
| --- | --- | --- |
| 0 | 25.7 | 5 |
| 17 | 180 | 27 |
| 47 | 190 | 30 |
| 47 | 190 | 150 |
| 52 | 190 | 150 |
| 53 | 55 | 150 |
| 54 | 55 | 0 |
| 60 | 25 | 0 |

Example 5

Figure 5:
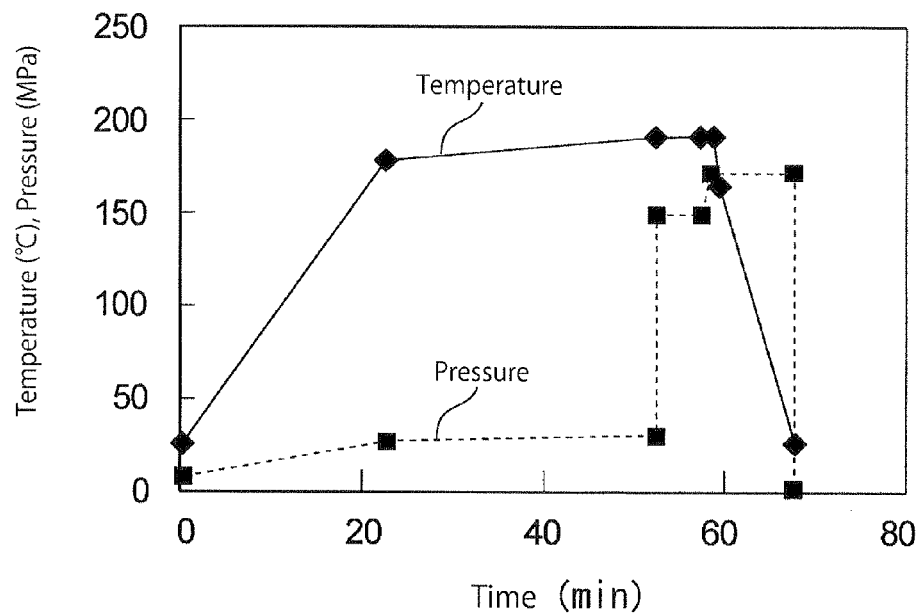
FIG. 5 is a graph showing a heat application profile and a pressure application profile in Example 5.

A sample bag with a block test piece inside was subjected to heat application and pressure application in the same manner as in Example 4. Thereafter, the pressure was further raised to 170 MPa at the start of cooling and the sample bag was cooled to room temperature while the pressure was maintained at 170 MPa. Subsequently, the test piece treated in the above manner was taken from the sample bag, resulting in a formed polypropylene resin body. The heat application profile and pressure application profile in the above heating, pressure application, and cooling steps in Example 5 are shown in FIG. 5 and Table 5.

TABLE 5

| Time | Temperature | Pressure |
| --- | --- | --- |
| 0 | 25.7 | 5 |
| 22 | 180 | 27 |
| 52 | 190 | 30 |
| 52 | 190 | 150 |
| 57 | 190 | 150 |
| 59 | 165 | 170 |
| 67 | 25 | 170 |
| 68 | 25 | 0 |

Comparative Example 1

Prepared was an injection-molded body made of polypropylene (polypropylene resin Grade MA3H having a melting point of 167° C. and a crystallization temperature range of 80° C. to 150° C., manufactured by Japan Polypropylene Corporation) and having a shape of 80 mm by 5 mm by 1 mm thick. This injection-molded body is regarded as a formed polypropylene resin body of Comparative Example 1.

Comparative Example 2

Figure 6:
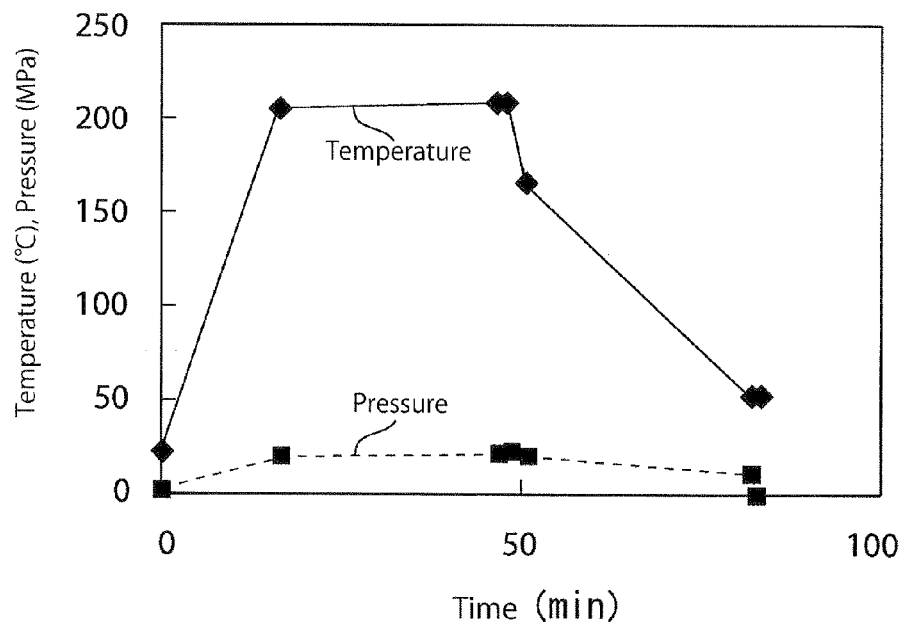
FIG. 6 is a graph showing a heat application profile and a pressure application profile in Comparative Example 1.

Prepared was an injection-molded body made of polypropylene (polypropylene resin Grade MA3H having a melting point of 167° C. and a crystallization temperature range of 80° C. to 150° C., manufactured by Japan Polypropylene Corporation) and having a shape of 80 mm by 5 mm by 1 mm thick. This polypropylene resin injection-molded body was enclosed in a pressure vessel at an ordinary temperature (25.7° C.) and the initial pressure was a hydrostatic pressure of 5 MPa. Next, the polypropylene resin injection-molded body enclosed in the pressure vessel was heated to 205° C. by a mantle heater disposed outside the pressure vessel. By the heating, the hydrostatic pressure raised to 23 MPa. Thereafter, the injection-molded body was heated to 209° C. in 30 minutes by the mantle heater. Subsequently, the injection-molded body was maintained at 209° C. for one minute. Thereafter, the injection-molded body was cooled to 165° C. at a cooling rate of 10° C./min or higher. Subsequently, the injection-molded body was cooled to 55° C. which was a cooling-end-temperature. The pressure was not maintained during the cooling and the hydrostatic pressure at 55° C. which was a cooing end temperature was 13 MPa. After the cooling, the pressure was eliminated and the formed polypropylene resin molded body was taken out, resulting in a formed polypropylene resin body. The heat application profile and pressure application profile in the above heating, pressure application, and cooling steps in Comparative Example 2 are shown in FIG. 6 and Table 6.

TABLE 6

| Time | Temperature | Pressure |
|---|---|---|
| 0 | 21.7 | 2 |
| 17 | 205 | 20 |
| 47 | 209 | 23 |
| 48 | 209 | 23 |
| 51 | 165 | 21 |
| 82 | 55 | 13 |
| 83 | 55 | 0 |

Comparative Example 3

Polypropylene of the same type as prepared in Example 4 was injection molded into a block test piece of 50 mm by 50 mm by 50 mm. This block test piece is regarded as a formed polypropylene resin body of Comparative Example 3.

(Evaluation of Melting Point and Degree of Crystallization)

The formed polypropylene resin bodies obtained by Examples 1 to 5 and Comparative Examples 1 to 3 were measured in terms of degree of crystallization and melting point in the following manners.

(1) Degree of Crystallization

The formed polypropylene resin bodies obtained by Examples 1 to 5 and Comparative Examples 1 to 3 were measured in terms of degree of crystallization in conformity with JIS K 7122. The results are shown in Table 7 below.

Specifically, the degree of crystallization was calculated by putting the sample into a container of a heat flux differential scanning calorimeter, heating the polymer article up to 200° C., finding the peak area of a DSC curve, dividing the peak area by 209 mJ/mg, and multiplying the obtained value by 100. For example, "DSC6220" manufactured by SII Nano-Technology Inc. was used as an apparatus for measuring the degree of crystallization.

(2) Melting Point

The formed polypropylene resin bodies obtained by Examples 1 to 5 and Comparative Examples 1 to 3 were measured in terms of melting point by determining a melting peak of the DSC as a temperature. The results are shown in Table 7 below.

For example, "DSC6220" manufactured by SII NanoTechnology Inc. was used as an apparatus for measuring the melting peak of the DSC.

TABLE 7

| | Degree of Crystallization (%) | Melting Point (° C.) |
|---|---|---|
| Example 1 | 58 | 177.7 |
| Example 2 | 58 | 178.7 |
| Example 3 | 57 | 180.2 |
| Example 4 | 60 | 178.7 |
| Example 5 | 62 | 180.2 |
| Comp. Ex. 1 | 47 | 167.7 |
| Comp. Ex. 2 | 33 | 165.1 |
| Comp. Ex. 3 | 47 | 167.7 |

As is evident from Table 7, the formed polypropylene resin bodies obtained by Examples 1 to 5 have significantly increased degrees of crystallization as compared with the formed polypropylene resin bodies of Comparative Examples 1 to 3 obtained simply by injection-molding polypropylene. The reason for this is that the formed polypropylene resin bodies of Examples 1 to 5 were obtained by subjecting the injection-molded body or the block test piece to heat application, pressure application, and cooling based on the heat application and pressure application profiles conforming to the production method of the present invention. Therefore, it can be believed that the resultant formed polypropylene resin bodies were increased in degree of crystallization.

Furthermore, the melting point Tm of the original polypropylene resin molded body in Comparative Example 1 was 167.7° C., while the melting point of the formed polypropylene resin body treated in Comparative Example 1 was, on the contrary, 165.1° C. which was lower than the former. In contrast, for the formed polypropylene resin bodies treated in Examples 1 to 5, the melting point Tm raised more than 10° C. from Tm0. The reason for this is, as described previously, that the resultant formed polypropylene resin bodies were increased in degree of crystallization.

Therefore, it can be seen that by following the production method of the present invention, a polypropylene resin injection-molded body increased in degree of crystallization and thermal resistance can be provided.

(Evaluation of Anisotropy)

The formed polypropylene resin bodies obtained by Examples 4 and 5 and Comparative Example 3 were measured in terms of variability in degree of crystallization and anisotropy of mechanical strength in the following manners.

(1) Variability in Degree of Crystallization

Each of the formed polypropylene resin bodies obtained by Examples 4 and 5 and Comparative Example 3 was measured in terms of degree of crystallization at arbitrary five points spaced 3 mm or more apart by the above method for measuring the degree of crystallization. The ratio between the maximum and minimum values of the degree of crystallization thus obtained was determined and used as an index representing the variability in degree of crystallization. The results are shown in Table 8.

(2) Anisotropy of Mechanical Strength

Test pieces having long axes in mutually perpendicular three directions were prepared from the formed polypropylene resin bodies obtained by Examples 4 and 5 and Comparative Example 3. The tensile elastic modulus of each test piece was measured by subjecting it to a tensile test under conditions of 23° C. and a test rate of 50 mm/min. The ratio between the maximum and minimum values of the tensile elastic modulus in each of the three directions thus obtained was determined and used as an index representing the anisotropy of mechanical strength. The results are shown in Table 8.

One of "TENSILON Universal Testing Instruments RTC series" manufactured by A&D Company, Limited was used as an apparatus for measuring the tensile elastic modulus.

TABLE 8

|  | Variability in Degree of Crystallization (max/min) | Anisotropy of Mechanical Strength (max/min) |
|---|---|---|
| Example 4 | 1.2 | 1.2 |
| Example 5 | 1.2 | 1.2 |
| Comp. Ex. 3 | 2.5 | 2 |

As is evident from Table 8, the formed polypropylene resin bodies obtained by Examples 4 and 5 have extremely small variabilities in degree of crystallization and extremely small anisotropy of mechanical strength as compared with the formed polypropylene resin body of Comparative Example 3 obtained simply by injection-molding polypropylene. The reason for this is that the formed polypropylene resin bodies of Examples 4 and 5 were obtained by subjecting the block test piece to heat application, pressure application, and cooling based on the production method of the present invention. Therefore, it can be believed that the resultant formed polypropylene resin bodies were increased in degree of crystallization and decreased in variability in degree of crystallization. Furthermore, it can be believed that since a three-dimensionally isotopic crystal structure was obtained by the above production method, the formed polypropylene resin bodies were also increased in isotropy of resin physical properties.

The invention claimed is:

1. A method for producing a polymer material, comprising the steps of:
    heating a thermoplastic resin to or above a melting point determined from a melting peak measured by DSC so that the thermoplastic resin becomes a thermoplastic resin melt;
    applying a pressure higher than atmospheric pressure to the thermoplastic resin melt;
    starting cooling the thermoplastic resin melt with a pressure higher than atmospheric pressure applied thereto; and
    releasing the pressure on the thermoplastic resin melt after cooling the thermoplastic resin melt to a cooling-end-temperature lower than an upper limit of a crystallization temperature range,
    wherein during the cooling, the pressure on the thermoplastic resin melt is maintained at the pressure higher than atmospheric pressure or raised to a pressure still higher than the pressure from the start of the cooling until the crystallization temperature or lower.

2. The method for producing a polymer material according to claim 1, wherein the cooling-end-temperature is a temperature equal to or lower than a lower limit of the crystallization temperature range.

3. The method for producing a polymer material according to claim 1, wherein the pressure is elevated in the cooling step from the start of the cooling until The cooling-end-temperature.

4. The method for producing a polymer material according to claim 1, wherein in applying the pressure to the thermoplastic resin melt, a hydrostatic pressure is applied.

5. The method for producing a polymer material according to claim 1, wherein a polyolefin is used as the thermoplastic resin.

6. A polymer material obtained by the method for producing a polymer material according to claim 1, the polymer material having a degree of crystallization of 50% or higher and isotropy of resin physical properties.

7. The polymer material according to claim 6, wherein, in a variation of the degree of crystallization, the maximum value thereof is two or less times the minimum value thereof.

8. A polymer material obtained by the method for producing a polymer material according to claim 1, wherein Tm is 10° C. to 20° C. higher than Tm0,
    where Tm0 is the melting point of an original thermoplastic resin, and Tm is the melting point of the resultant polymer material and determined from a melting peak measured by DSC.

9. The method for producing a polymer material according to claim 2, wherein the pressure is elevated in the cooling step from the start of the cooling until the cooling-end-temperature.

10. The method for producing a polymer material according to claim 2, wherein in applying the pressure to the thermoplastic resin melt, a hydrostatic pressure is applied.

11. The method for producing a polymer material according to claim 2, wherein a polyolefin is used as the thermoplastic resin.

12. A polymer material obtained by the method for producing a polymer material according to claim 2, the polymer material haying a degree of crystallization of 50% or higher and isotropy of resin physical properties.

13. The polymer material according to claim 12, wherein, in a variation of the degree of crystallization, the maximum value thereof is two or less times the minimum value thereof.

14. A polymer material obtained by the method for producing a polymer material according to claim 2, wherein Tm is 10° C. to 20° C. higher than Tm0,
    where Tm0 is the melting point of an original thermoplastic resin, and Tm is the melting point of the resultant polymer material and determined from a melting peak measured by DSC.

15. The method for producing a high-polymer material according to claim 1, wherein the thermoplastic resin that is prepared at the step of obtaining the thermoplastic resin melt is a molding product of the thermoplastic resin, and the molding product of the thermoplastic resin is heated into the thermoplastic resin melt.

* * * * *